(12) United States Patent
Jeon et al.

(10) Patent No.: US 7,738,063 B2
(45) Date of Patent: Jun. 15, 2010

(54) VERTICALLY ALIGNED LIQUID CRYSTAL DISPLAY USING POLYNORBORNENE BASED POLYMER FILM

(75) Inventors: Byoung-kun Jeon, Daejeon (KR); Jeong-su Yu, Daejeon (KR); Sergey Belyaev, Daejeon (KR); Won-kook Kim, Daejeon (KR); Sung-ho Chun, Daejeon (KR); Sung-cheol Yoon, Iksan-si (KR); Tae-sun Lim, Seoul (KR); Heon Kim, Daejeon (KR); Jung-min Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 904 days.

(21) Appl. No.: 11/030,324

(22) Filed: Jan. 7, 2005

(65) Prior Publication Data
US 2005/0190326 A1    Sep. 1, 2005

(30) Foreign Application Priority Data
Jan. 8, 2004    (KR)    ........... 10-2004-0001260

(51) Int. Cl.
    *G02F 1/1335*    (2006.01)
(52) U.S. Cl. ................................... 349/117
(58) Field of Classification Search ............ 349/130, 349/117
    See application file for complete search history.

(56) References Cited

U.S. PATENT DOCUMENTS

| 4,889,412 A | | 12/1989 | Clerc et al. | |
|---|---|---|---|---|
| 5,344,916 A | | 9/1994 | Harris et al. | |
| 5,583,679 A | | 12/1996 | Ito et al. | |
| 6,141,075 A | * | 10/2000 | Ohmuro et al. | 349/130 |
| 7,153,547 B2 | * | 12/2006 | Nishikouji et al. | 428/1.1 |
| 7,270,855 B2 | * | 9/2007 | Yamaoka et al. | 428/1.1 |
| 2004/0091725 A1 | * | 5/2004 | Chang et al. | 428/480 |

\* cited by examiner

*Primary Examiner*—David Nelms
*Assistant Examiner*—Nathanael R Briggs
(74) *Attorney, Agent, or Firm*—McKenna Long & Aldridge LLP

(57) ABSTRACT

Provided are a vertically aligned liquid crystal display (VA-LCD) with good viewing angle characteristics, which has liquid crystals with negative dielectric anisotropy ($\Delta\varepsilon<0$). In the VA-LCD, a polynorbornene based polymer film is used as a protection film and/or as a negative C-plate retardation film for an upper polarization plate and/or a lower polarization plate. Therefore, high contrast characteristics for a front view and an oblique angle view are realized and color change for an oblique angle view can be minimized.

8 Claims, 12 Drawing Sheets

US 7,738,063 B2

VERTICALLY ALIGNED LIQUID CRYSTAL DISPLAY USING POLYNORBORNENE BASED POLYMER FILM

TECHNICAL FIELD

The present invention relates to a liquid crystal display (LCD) with excellent viewing angle characteristics. More particularly, the present invention relates to a vertically aligned LCD (VA-LCD) including liquid crystals with negative dielectric anisotropy ($\Delta\in<0$).

BACKGROUND ART

A negative C-plate compensation film used in common liquid crystal displays (LCDs) is disclosed in U.S. Pat. No. 4,889,412. A main function of the negative C-plate compensation film is to compensate for the black state of vertically aligned LCDs (VA-LCDs) under no voltage application. However, VA-LCDs including only a negative C-plate compensation film have a disadvantage of light leakage at an oblique angle due to imperfect viewing angle compensation.

Combination of a negative C-plate compensation film and an A-plate compensation film is disclosed in U.S. Pat. No. 6,141,075. According to the technology disclosed in this patent, good viewing angle compensation of the black state of a VA-LCD under no voltage application is achieved. However, for perfect compensation, enhancements in contrast characteristics and color change for front view and oblique angle view are required.

DISCLOSURE OF INVENTION

In view of these problems, the present invention provides a vertically aligned liquid crystal display (VA-LCD) including liquid crystals with negative dielectric anisotropy ($\Delta\in<0$) and a polarization plate for viewing angle compensation that can enhance viewing angle characteristics. The polarization plate can perform optical compensation for wide viewing angles using a polynorbornene based polymer film with negative birefringence in its thickness direction even without a film stretching process. Therefore, high contrast characteristics for front view and oblique angle view are realized and color change for oblique angle view is minimized.

According to an aspect of the present invention, there is provided a VA-LCD including at least one unstretched transparent film between a vertically aligned panel and a polarization plate, wherein a total thickness retardation value ($R_{total}$) of the VA-LCD is defined as:

$$R_{total} = R_{-C} + R_{VA},$$

$$30 \text{ nm} \leq R_{total}(=R_{VA}+R_{-C}) \leq 180 \text{ nm},$$

wherein $R_{-C}$ is the total thickness retardation value for negative C-plate type retardation films, as given by:

$R_{-C}$=(thickness retardation value of inner protection film of polarization plate)+(thickness retardation value of biaxial A-plate)+(thickness retardation value of negative C-plate);

$R_{VA}$ is the retardation value of the vertically aligned panel; and $R_{total}$ is the sum of $R_{VA}$ and $R_{-C}$.

The unstretched transparent film may be a polynorbornene based polymer film.

The VA-LCD may include, from bottom to top, a lower polarization plate, a vertically aligned panel, and an upper polarization plate, wherein at least one of the lower polarization plate and the upper polarization plate includes at least one negative C-plate type retardation film made of a polynorbornene based polymer.

The VA-LCD may include, from bottom to top, a lower polarization plate, a vertically aligned panel, and an upper polarization plate, wherein at least one of the lower polarization plate and the upper polarization plate includes an inner protection film made of a polynorbornene based polymer.

The VA-LCD may include, from bottom to top, a lower polarization plate, a vertically aligned panel, and an upper polarization plate, wherein at least one of the lower polarization plate and the upper polarization plate includes a negative C-plate type retardation film as a protection film for a polarization film.

Hereinafter, the present invention will be described in detail.

The present inventors found that a polynorbornene based polymer film formed by a plastics processing technique (solution casting) has a negative birefringence in the thickness direction of the film even without a separate film stretching process. The present inventors also found that a polynorbornene based polymer does not absorb light of the visible light range, and thus, exhibits flat wavelength dispersion characteristics. In particular, it was found that when a polynorbornene based polymer forms a film with a thickness of 40-200 μm that can be used as a protection film in a common polarization plate, a thickness retardation value ($R_{th}$) of −60 to −800 nm can be achieved. In addition, it was found that the polynorbornene based polymer film serves both as a protection film for a polarization plate and as a negative C-plate retardation film in a VA-LCD. The present inventors thus completed the present invention.

A VA-LCD of the present invention consists essentially of a vertically aligned panel and a polarization plate. The polarization plate includes at least one polynorbornene based polymer film.

In detail, a VA-LCD of the present invention includes a vertically aligned panel (VA panel) and polarization plates disposed on both sides of the VA panel. In particular, a polarization plate disposed on a side of the VA panel has a fundamental structure of protection film 12/polarization film 11/protection film 12, like a common polarization plate as shown in FIG. 1. An outer protection film must be made of a transparent material with 90% or more of visible light transmittance and have good moisture resistance and bond strength. An inner protection film must be made of a transparent material with 90% or more of visible light transmittance and have good heat resistance, small elastic modulus, small film deformation, and good bond strength.

A VA-LCD of the present invention is also based on a polarization plate of a common VA-LCD as shown in FIG. 2. The polarization plate of FIG. 2 is obtained by combination of the fundamental structure of FIG. 1 with an A-plate retardation film, i.e., an in-plane retardation film, and a negative C-plate retardation film, i.e., a negative thickness retardation film, for wide viewing angle compensation.

According to a VA-LCD of the present invention, polarization plates are attached on both sides (upper and lower surfaces) of a VA panel, and in particular, a polynorbornene based polymer film is used as a negative C-plate type retardation film. Also, a protection film 12 and a negative C-plate type retardation film of a polarization plate may be formed as a single film capable of performing a compensation-protection function.

In more detail, according to the present invention, a film used as a negative C-plate type retardation film is a transparent film made of a polynorbornene based copolymer. The polynorbornene based polymer film has a negative birefringence in its thickness direction and no light absorption in the visible light range. In particular, when the polynorbornene based polymer film is formed to a thickness of 40 to 200 μm for use as a protection film for a common polarization plate, it can be used as a negative C-plate retardation film due to realization of thickness retardation value ($R_{th}$) of −60 to −800 nm.

Furthermore, the polynorbornene based polymer film has low moisture absorptivity and good bond strength with a polyvinylalcohol (PVA) polarization film, thereby ensuring good durability. Therefore, the polynorbornene based polymer film can also be used as a protection film for a polarization film.

Still furthermore, the polynorbornene based polymer film can be used both as a negative C-plate retardation film and as a protection film for a polarization film.

According to a VA-LCD of the present invention, a polynorbornene based polymer film can be used as a protection film for a polarization film, as a negative C-plate retardation film, or both as a protection film for a polarization film and as a negative C-plate retardation film. In this respect, a VA-LCD of the present invention may have various structures as follows.

A VA-LCD according to a first embodiment of the present invention has a structure as shown in FIG. 3, i.e., includes, from bottom to top:

i) a lower polarization plate 15 including an outer protection film 121, a polarization film 11, an inner protection film 122, an adhesive, an A-plate retardation film 13, and an adhesive;

ii) a VA panel 10; and iii) an upper polarization plate 16 including an adhesive, an inner protection and negative C-plate retardation film 200 made of a polynorbornene based polymer, a polarization film 11, and an outer protection film 121.

A VA-LCD according to a second embodiment of the present invention has a structure as shown in FIG. 4, i.e., includes, from bottom to top:

i) a lower polarization plate 15 including an outer protection film 121, a polarization film 11, an inner protection and negative C-plate retardation film 200 made of a polynorbornene based polymer, an adhesive, an A-plate retardation film 13, and an adhesive;

ii) a VA panel 10; and iii) an upper polarization plate 16 including an adhesive, an inner protection film 122, a polarization film 11, and an outer protection film 121.

A VA-LCD according to a third embodiment of the present invention has a structure as shown in FIG. 5, i.e., includes, from bottom to top:

i) a lower polarization plate 15 including an outer protection film 121, a polarization film 11, an inner protection and first negative C-plate retardation film 200 made of a polynorbornene based polymer, an adhesive, an A-plate retardation film 13, and an adhesive;

ii) a VA panel 10; and iii) an upper polarization plate 16 including an adhesive, an inner protection and second negative C-plate retardation film 200 made of a polynorbornene based polymer, a polarization film 11, and an outer protection film 121.

A VA-LCD according to a fourth embodiment of the present invention has a structure as shown in FIG. 6, i.e., includes, from bottom to top:

i) a lower polarization plate 15 including an outer protection film 121, a polarization film 11, an inner protection film 122, and an adhesive;

ii) a VA panel 10; and iii) an upper polarization plate 16 including an adhesive, an A-plate retardation film 13, an adhesive, an inner protection and negative C-plate retardation film 200 made of a polynorbornene based polymer, a polarization film 11, and an outer protection film 121.

A VA-LCD according to a fifth embodiment of the present invention has a structure as shown in FIG. 7, i.e., includes, from bottom to top:

i) a lower polarization plate 15 including an outer protection film 121, a polarization film 11, an inner protection and negative C-plate retardation film 200 made of a polynorbornene based polymer, and an adhesive;

ii) a VA panel 10; and iii) an upper polarization plate 16 including an adhesive, an A-plate retardation film 13, an adhesive, an inner protection film 122, a polarization film 11, and an outer protection film 121.

A VA-LCD according to a sixth embodiment of the present invention has a structure as shown in FIG. 8, i.e., includes, from bottom to top:

i) a lower polarization plate 15 including an outer protection film 121, a polarization film 11, an inner protection and first negative C-plate retardation film 200 made of a polynorbornene based polymer, and an adhesive;

ii) a VA panel 10; and iii) an upper polarization plate 16 including an adhesive, an A-plate retardation film 13, an adhesive, an inner protection and second negative C-plate retardation film 200 made of a polynorbornene based polymer, a polarization film 11, and an outer protection film 121.

A VA-LCD according to a seventh embodiment of the present invention has a structure as shown in FIG. 9, i.e., includes, from bottom to top:

i) a lower polarization plate 15 including an outer protection film 121, a polarization film 11, an inner protection film 122, an adhesive, a first A-plate retardation film 13, and an adhesive;

ii) a VA panel 10; and iii) an upper polarization plate 16 including an adhesive, a second A-plate retardation film 13, an adhesive, an inner protection and negative C-plate retardation film 200 made of a polynorbornene based polymer, a polarization film 11, and an outer protection film 121.

A VA-LCD according to an eighth embodiment of the present invention has a structure as shown in FIG. 10, i.e., includes, from bottom to top:

i) a lower polarization plate 15 including an outer protection film 121, a polarization film 11, an inner protection and negative C-plate retardation film 200 made of a polynorbornene based polymer, an adhesive, a first A-plate retardation film 13, and an adhesive;

ii) a VA panel 10; and iii) an upper polarization plate 16 including an adhesive, a second A-plate retardation film 13, an adhesive, an inner protection film 122, a polarization film 11, and an outer protection film 121.

A VA-LCD according to a ninth embodiment of the present invention has a structure as shown in FIG. 11, i.e., includes, from bottom to top:

i) a lower polarization plate 15 including an outer protection film 121, a polarization film 11, an inner protection and first negative C-plate retardation film 200 made of a polynorbornene based polymer, an adhesive, a first A-plate retardation film 13, and an adhesive;

ii) a VA panel 10; and iii) an upper polarization plate 16 including an adhesive, a second A-plate retardation film 13, an adhesive, an inner protection and second negative C-plate retardation film 200 made of a polynorbornene based polymer, a polarization film 11, and an outer protection film 121.

A VA-LCD according to a tenth embodiment of the present invention has a structure as shown in FIG. 12, i.e., includes, from bottom to top:

i) a lower polarization plate 15 including an outer protection film 121, a polarization film 11, an inner protection film 122, an adhesive, an A-plate retardation film 13, an adhesive, a negative C-plate retardation film 100 made of a polynorbornene based polymer, and an adhesive;

ii) a VA panel 10; and iii) an upper polarization plate 16 including an adhesive, an inner protection film 122, a polarization film 11, and an outer protection film 121.

A VA-LCD according to an eleventh embodiment of the present invention has a structure as shown in FIG. 13, i.e., includes, from bottom to top:

i) a lower polarization plate 15 including an outer protection film 121, a polarization film 11, an inner protection film 122, an adhesive, a negative C-plate retardation film 100 made of a polynorbornene based polymer, and an adhesive;

ii) a VA panel 10; and iii) an upper polarization plate 16 including an adhesive, an A-plate retardation film 13, an adhesive, an inner protection film 122, a polarization film 11, and an outer protection film 121.

A VA-LCD according to a twelfth embodiment of the present invention has a structure as shown in FIG. 14, i.e., includes, from bottom to top:

i) a lower polarization plate 15 including an outer protection film 121, a polarization film 11, an inner protection film 122, an adhesive, an A-plate retardation film 13, and an adhesive;

ii) a VA panel 10; and iii) an upper polarization plate 16 including an adhesive, a negative C-plate retardation film 100 made of a polynorbornene based polymer, an adhesive, an inner protection film 122, a polarization film 11, and an outer protection film 121.

A VA-LCD according to a thirteenth embodiment of the present invention has a structure as shown in FIG. 15, i.e., includes, from bottom to top:

i) a lower polarization plate 15 including an outer protection film 121, a polarization film 11, an inner protection film 122, and an adhesive;

ii) a VA panel 10; and iii) an upper polarization plate 16 including an adhesive, a negative C-plate retardation film 100 made of a polynorbornene based polymer, an adhesive, an A-plate retardation film 14, an adhesive, an inner protection film 122, a polarization film 11, and an outer protection film 121.

A VA-LCD according to a fourteenth embodiment of the present invention has a structure as shown in FIG. 16, i.e., includes, from bottom to top:

i) a lower polarization plate 15 including an outer protection film 121, a polarization film 11, an inner protection film 122, an adhesive, a first A-plate retardation film 13, an adhesive, a negative C-plate retardation film 100 made of a polynorbornene based polymer, and an adhesive;

ii) a VA panel 10; and iii) an upper polarization plate 16 including an adhesive, a second A-plate retardation film 13, an adhesive, an inner protection film 200, a polarization film 11, and an outer protection film 121.

A VA-LCD according to a fifteenth embodiment of the present invention has a structure as shown in FIG. 17, i.e., includes, from bottom to top:

i) a lower polarization plate 15 including an outer protection film 121, a polarization film 11, an inner protection film 122, an adhesive, a first A-plate retardation film 13, and an adhesive;

ii) a VA panel 10; and iii) an upper polarization plate 16 including an adhesive, a negative C-plate retardation film 100 made of a polynorbornene based polymer, an adhesive, a second A-plate retardation film 13, an adhesive, an inner protection film 122, a polarization film 11, and an outer protection film 121.

A VA-LCD according to a sixteenth embodiment of the present invention has a structure as shown in FIG. 18, i.e., includes, from bottom to top:

i) a lower polarization plate 15 including an outer protection film 121, a polarization film 11, an inner protection film 122, an adhesive, a first A-plate retardation film 13, an adhesive, a first negative C-plate retardation film 100 made of a polynorbornene based polymer, and an adhesive;

ii) a VA panel 10; and iii) an upper polarization plate 16 including an adhesive, a second negative C-plate retardation film 100 made of a polynorbornene based polymer, an adhesive, a second A-plate retardation film 13, an adhesive, an inner protection film 122, a polarization film 11, and an outer protection film 121.

Even though adhesives are not shown in FIGS. 3 through 18, use of an adhesive or a bond is required for adhesion of other films and panels except adhesion between polarization films and protection films.

Hereinafter, a VA-LCD including a polarization film, an A-plate type retardation film, a negative C-plate type retardation film, and a protection film according to the present invention will be described in detail.

A VA-LCD of the present invention includes a VA panel composed of liquid crystal cells containing liquid crystals with negative dielectric anisotropy ($\Delta\epsilon<0$) between two glass substrates, like in a common VA-LCD. Since polarization plates with absorption axes are disposed on upper and lower surfaces of a VA panel, a VA-LCD of the present invention is a MVA (multidomain vertically aligned) mode LCD, a PVA (patterned vertically aligned) mode LCD, or a VA mode LCD using a chiral additive. A cell gap between the liquid crystal cells constituting the VA panel is in the range from 2 to 10 μm, preferably from 3 to 8 μm.

Since the VA panel has a positive thickness retardation value ($R_{th}$), it is also called positive C-plate (+C-plate). At this time, the retardation value ($R_{VA}$) of the VA panel satisfies Equation 1 below:

$$R_{VA}=R_{th1}, \quad (1)$$

where $R_{VA}$ is the retardation value of the VA panel and $R_{th1}$ is the thickness retardation value of the VA panel.

In the present invention, assuming that the total thickness retardation value for all negative C-plate type films that can be used for optical compensation in the thickness direction is $R_{-th}$ and the retardation value of the positive C-plate is $R_{th}$, the relationship between the negative C-plate type films and the positive C-plate satisfies the following Equation 2.

Examples of the negative C-plate type films include polynorbornene based films, triacetate cellulose (TAC) based films, biaxially stretched films, and homogeneously oriented liquid crystal films.

$$R_{-th} = -R_{th} = R_{-C}, \quad (2)$$

Thus, the total thickness retardation value of the VA-LCD is defined as Equation 3 below.

That is, as given in Equation 3, the total thickness retardation value ($R_{total}$) of the VA-LCD can be represented by difference between the thickness retardation value of the VA panel and the total thickness retardation value for all films constituting polarization plates.

A VA-LCD of the present invention must have the total thickness retardation value of 30 to 180 nm, preferably 50 to 150 nm. Also, the total thickness retardation value according to the wavelength of the visible light range is maintained constant. That is, a VA-LCD of the present invention satisfies Equation 4 below.

$$R_{total} = R_{VA} + R_{-C}, \quad (3)$$

$R_{total}$ in Equation 3 can be represented by Equation 3-1 below:

$$R_{total} = R_{VA} + R_{-th} = R_{th1} + R_{-th} = R_{th1} - R_{th}, \quad (3\text{-}1)$$

where $R_{total}$ is the sum of $R_{VA}$ and $R_{-C}$, $R_{th}$ is a thickness retardation value, $R_{th1}$ equals to $R_{VA}$, $R_{-th}$ equals to $R_{-C}$.

$$30 \text{ nm} \leq R_{total} (= R_{VA} + R_{-C}) \leq 180 \text{ nm}, \quad (4)$$

wherein $R_{-C}$ is the total thickness retardation value for negative C-plate type optical films, as given by Equation 5 below:

$$R_{-C} = \text{(thickness retardation value of inner protection film of polarization plate)} + \text{(thickness retardation value of biaxial } A\text{-plate)} + \text{(thickness retardation value of negative } C\text{-plate)}, \quad (5)$$

$R_{VA}$ is the thickness retardation value of the VA panel; and $R_{total}$ is the sum of $R_{VA}$ and $R_{-C}$.

Optical anisotropy can be divided into in-plane retardation value ($R_{in}$) and thickness retardation value ($R_{th}$). FIG. 19 illustrates a coordinate system used in defining the refractive index of a film. When the in-plane slow axis refractive index and fast axis refractive index of a film are respectively $n_x$ and $n_y$, and the refractive index in the thickness direction of the film is $n_z$, the in-plane retardation value ($R_{in}$) and the thickness retardation value ($R_{th}$) are defined as $$R_{in} = d \times (n_x - n_y), \quad (6)$$

$$R_{th} = d \times (n_z - n_y), \quad (7)$$

where $R_{in}$ is an in-plane retardation value, $R_{th}$ is a thickness retardation value, $n_x$ is an in-plane slow axis (x-axis) refractive index, $n_y$ is an in-plane fast axis (y-axis) refractive index, $n_z$ is a thickness (z-axis) refractive index, and d is a film thickness.

In a case where one of the two components of each of $R_{in}$ and $R_{th}$ in Equations 6 and 7 is zero and the other component is not zero, a uniaxial optical anisotropy compensation film can be obtained. In a case where each absolute value of the two components is not zero, a biaxial optical anisotropy compensation film can be obtained.

There are largely two groups of films that can be used as compensation films in a VA-LCD of the present invention: A-plate type film for in-plane compensation and C-plate type film for thickness compensation.

An A-plate type film may be a retardation film of a uniaxial A-plate type satisfying the following Equation 8 or a retardation film of a negative biaxial A-plate type satisfying the following Equation 9. In the case of using a uniaxial A-plate retardation film, a thickness retardation value is zero or negligible. On the other hand, a negative biaxial A-plate retardation film has both an in-plane retardation value and a thickness retardation value, and thus, affects $R_{-C}$.

$$n_x > n_y = n_z, \quad (8)$$

$$n_x > n_y > n_z, \quad (9)$$

where $n_x$ and $n_y$ are each an in-plane refractive index as measured at a wavelength of 550 nm, and $n_z$ is a thickness refractive index as measured at a wavelength of 550 nm.

A retardation film with the same refractive index as in Equation 8 is called uniaxial A-plate retardation film. The uniaxial A-plate retardation film may be a uniaxially stretched polymer film or a liquid crystal film in which directors of liquid crystal molecules are aligned in a predetermined direction parallel to in-plane of a film.

A retardation film with the same refractive index as in Equation 9 is called negative biaxial A-plate retardation film. The negative biaxial A-plate retardation film may be a biaxially stretched polymer film or a liquid crystal polymer film.

An A-plate type retardation film has an in-plane retardation value of 40 to 500 nm at a wavelength of 550 nm. In particular, it is preferable that the A-plate type retardation film has a thickness retardation value of up to 200 nm, and more particularly from 80 to 160 nm, at a wavelength of 550 nm. Preferably, the A-plate type retardation film has normal wavelength dispersion or abnormal wavelength dispersion such as flat wavelength dispersion or reverse wavelength dispersion.

A VA mode LCD according to the present invention has specific liquid crystal alignment and specific negative dielectric anisotropy ($\Delta\epsilon<0$). To compensate for optical axis change of linearly polarized light due to such VA mode optical anisotropy, various optical anisotropy compensation films are required. In particular, considering only compensation for a polarized optical axis by liquid crystals, an ideal compensation film must have a mirror phase optical axis with respect to the optical axis of a liquid crystal layer. In this respect, a VA mode LCD according to the present invention, in which a thickness refractive index is much larger than an in-plane refractive index, requires a negative C-plate with negative birefringence in its thickness direction.

A negative C-plate type film according to the present invention is a film satisfying Equation 10 below:

$$n_x = n_y > n_z, \quad (10)$$

where $n_x$ and $n_y$ are each the in-plane refractive index as measured at a wavelength of 550 nm, an $n_z$ is the thickness refractive index as measured at a wavelength of 550 nm.

As an example of a polymer material that can be used for the negative C-plate type film, there are commonly known a discotic liquid crystal (U.S. Pat. No. 5,583,679) and polyimide in which a planar phenyl group is added to a polymer backbone (U.S. Pat. No. 5,344,916).

A negative C-plate type film of the present invention is a film made of a polynorbornene based polymer in which only cyclic olefin is added to a polymer backbone. As described above, the polynorbornene based polymer film has negative birefringence in its thickness direction and exhibits flat wavelength dispersion characteristics in which a retardation value with respect to the wavelength of visible light range is maintained almost constant. A polynorbornene based polymer film with an appropriate thickness can be used as a C-plate with a thickness retardation value of −60 to −800 nm at a wavelength of 550 nm.

In the present invention, in addition to polynorbornene based polymers, cyclic olefin polymers (COPs) (e.g., polymers prepared by ring-opening polymerization and hydrogenation and addition copolymers of cyclic olefin monomers and non-cyclic olefin monomers; cyclic olefin and non-cyclic olefin coexist on a polymer backbone) or cellulosics may also be used for a negative C-plate or an inner protection film. A copolymer or a blend of two or more of the above-described polymers may be formed as a film. However, the present invention is not limited to the above-illustrated polymers.

According to the present invention, it is preferable that a polynorbornene based polymer film used as a protection film for a polarization film or as a negative C-plate retardation film contains a cyclic olefin-based addition polymer as a polynorbornene based polymer.

The polynorbornene based polymer is:

(i) a homopolymer of a compound represented by the following Formula 1; or (ii) a copolymer of different two or more compounds represented by the Formula 1:

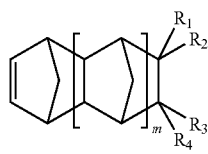

<Formula 1> wherein m is an integer of 0 to 4;

$R_1$, $R_2$, $R_3$, and $R_4$ are each independently selected from the group consisting of hydrogen; halogen; straight or branched alkyl, alkenyl, or vinyl of 1 to 20 carbon atoms; substituted or unsubstituted cycloalkyl of 5 to 12 carbon atoms; substituted or unsubstituted aryl of 6 to 40 carbon atoms; substituted or unsubstituted aralkyl of 7 to 15 carbon atoms; alkynyl of 3 to 20 carbon atoms; straight or branched haloalkyl, haloalkenyl, or halovinyl of 1 to 20 carbon atoms; substituted or unsubstituted halocycloalkyl of 5 to 12 carbon atoms; substituted or unsubstituted haloaryl of 6 to 40 carbon atoms; substituted or unsubstituted haloaralkyl of 7 to 15 carbon atoms; haloalkynyl of 3 to 20 carbon atoms; and a non-hydrocarbonaceous polar group containing at least one of oxygen, nitrogen, phosphorus, sulfur, silicon, and boron.

When $R_1$, $R_2$, $R_3$, and $R_4$ are not hydrogen, halogen, and a polar group, $R_1$ and $R_2$, or $R_3$ and $R_4$ are connected to form an alkylidene group of 1 to 10 carbon atoms. Alternatively, $R_1$ or $R_2$ may be connected to one of $R_3$ and $R_4$ to form a saturated or unsaturated cyclic group of 4 to 12 carbon atoms or an aromatic ring compound of 6 to 24 carbon atoms.

Preferably, the non-hydrocarbonaceous polar group of the Formula 1 is selected from the following functional groups: —C(O)OR$_6$, —R$_5$C(O)OR$_6$, —OR$_6$, —OC(O)OR$_6$, —R5OC(O)OR$_6$, —C(O)R$_6$, —R$_5$C(O)R$_6$, —OC(O)R$_6$, —R$_5$OC(O)R$_6$, —(R$_5$O)p-OR$_6$, —(OR$_5$)p-OR$_6$, —C(O)—O—C(O)R$_6$, —R$_5$C(O)—O—C(O)R$_6$, —SR$_6$, —R$_5$SR$_6$, —SSR$_6$, —R$_5$SSR$_6$, —S(=O)R$_6$, —R$_5$S(=O)R$_6$, —R$_5$C(=S)R$_6$, —R$_5$C(=S)SR$_6$, —R$_5$SO$_3$R$_6$, —SO$_3$R$_6$, —R$_5$N=C=S, —NCO, R$_5$—NCO, —CN, —R$_5$CN, —NNC(=S)R$_6$, —R$_5$NNC(=S)R$_6$, —NO$_2$, —R$_5$NO$_2$,

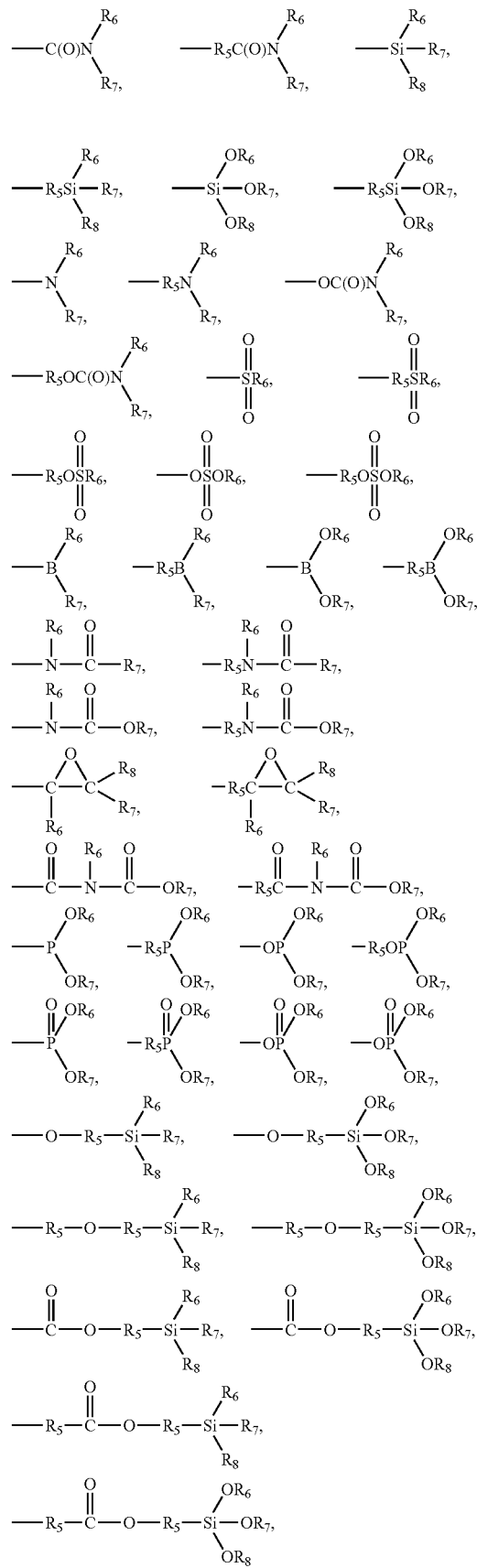

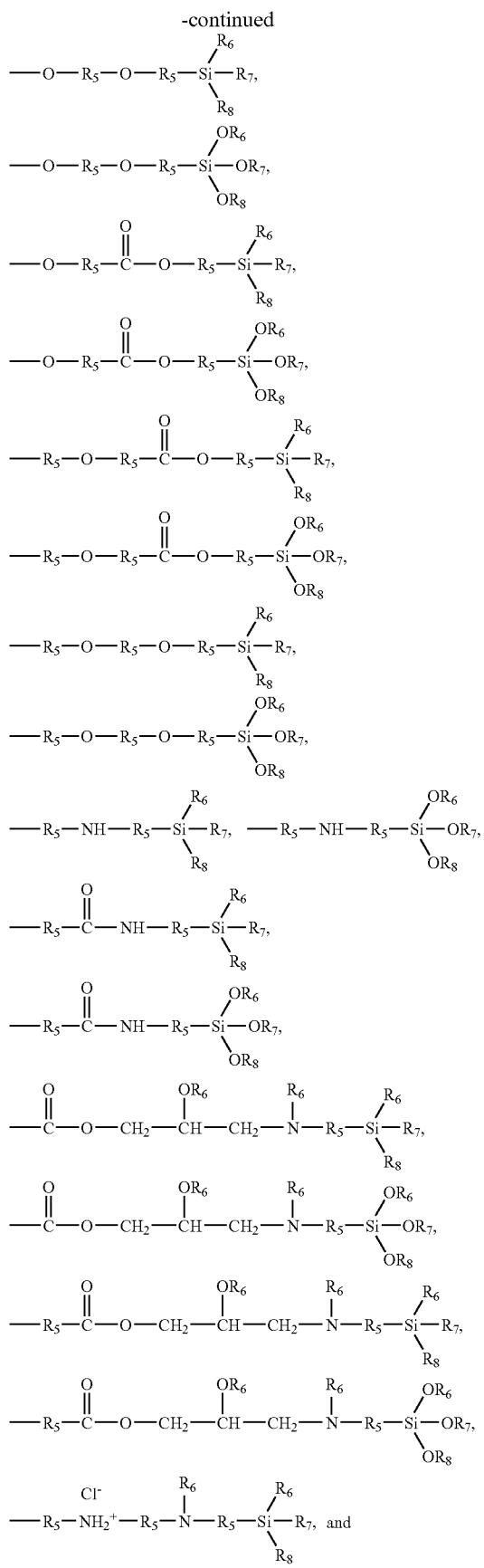

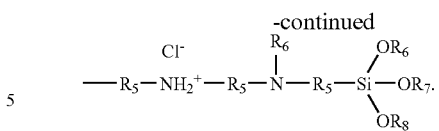

In the above functional groups, each $R_5$ is straight or branched alkyl, haloalkyl, alkenyl, haloalkenyl, vinyl, or halovinyl of 1 to 20 carbon atoms; substituted or unsubstituted cycloalkyl or halocycloalkyl of 4 to 12 carbon atoms; substituted or unsubstituted aryl or haloaryl of 6 to 40 carbon atoms; substituted or unsubstituted aralkyl or haloaralkyl of 7 to 15 carbon atoms; alkynyl or haloalkynyl of 3 to 20 carbon atoms; each $R_6$, $R_7$, and $R_8$ is hydrogen; halogen; straight or branched alkyl, haloalkyl, alkenyl, haloalkenyl, vinyl, halovinyl, alkoxy, haloalkoxy, carbonyloxy, halocarbonyloxy of 1 to 20 carbon atoms; substituted or unsubstituted cycloalkyl or halocycloalkyl of 4 to 12 carbon atoms; substituted or unsubstituted aryl, haloaryl, aryloxy, or haloaryloxy of 6 to 40 carbon atoms; substituted or unsubstituted aralkyl or haloaralkyl of 7 to 15 carbon atoms; alkynyl or haloalkynyl of 3 to 20 carbon atoms; and each p is an integer of 1 to 10.

The polynorbornene based polymer may be a non-polar functional group-containing cyclic olefin-based addition polymer or a polar functional group-containing cyclic olefin-based addition polymer. In detail, the polynorbornene based polymer may be a homopolymer of polar functional group-containing norbornene based monomers, a copolymer of different polar functional group-containing norbornene based monomers, or a copolymer of a non-polar functional group-containing norbornene based monomer and a polar functional group-containing norbornene based monomer.

According to the present invention, a transparent film containing a polynorbornene based polymer that is used as a protection film for a polarization film or as a negative C-plate retardation film is preferably formed by a solution casting method by which a solution of a polynorbornene based polymer in a solvent is cast into a film. A transparent film thus obtained may be surface-treated by one or more selected from the group consisting of corona discharge, glow discharge, blazing, acid treatment, alkaline treatment, UV radiation, and coating.

Polarization plates disposed on both sides of a VA panel of a VA-LCD according to the present invention include a polarization film, like a common polarization plate. Preferably, the polarization film is formed by dying a PVA film with iodine or dichromatic dye, like a polarization film used in a common LCD, but the present invention is not limited thereto.

A protection film for a polarization film in a VA-LCD of the present invention may be a polynorbornene based polymer film serving both as a negative C-plate retardation film and as a protection film, or alternatively, a COP or cellulose film as described above, in particular a TAC film, but the present invention is not limited thereto.

A VA-LCD of the present invention includes a VA panel composed of liquid crystal cells containing liquid crystals with negative dielectric anisotropy ($\Delta\varepsilon<0$) between two glass substrates. In particular, since upper and lower polarization plates with absorption axes are respectively disposed on upper and lower surfaces of a VA panel, a VA-LCD of the present invention is a MVA mode LCD, a PVA mode LCD, or a VA mode LCD using a chiral additive. The absorption axes of the upper and lower polarization plates are perpendicular to the optical slow axis of an A-plate compensation film as described above. The absorption axes of the upper and lower polarization plates form an angle of 90 degrees with respect to each other. Under voltage application, liquid crystal directors in liquid crystal cells are oriented at an angle of 45 degrees with respect to the absorption axis of each polarization plate.

FIG. 20 illustrates an angle formed between the absorption axis 1 of a polarization plate and the optical slow axis 2 of an A-plate according to the present invention. Referring to FIG. 20, for viewing angle compensation of a VA-LCD, the absorption axis 1 of the polarization plate and the optical slow axis 2 of the A-plate are perpendicular to each other.

FIG. 21 illustrates an angle formed between the absorption axis of an upper polarization plate and the absorption axis of a lower polarization plate. A reference numeral 3 is the absorption axis of the lower polarization plate, a reference numeral 4 is the absorption axis of the upper polarization plate, and a reference numeral 5 is the orientation of a liquid crystal director in a liquid crystal cell.

In a VA-LCD of the present invention, for optical compensation in the thickness direction, a polynorbornene based polymer film with negative birefringence in its thickness direction is used as a protection-compensation film serving both as an inner protection film and as a negative C-plate, or as a negative C-plate retardation film added to a polarization plate. This is in contrast to a common polarization plate in which an organic material such as a discotic liquid crystal with negative birefringence in its thickness direction is coated on a protection film for a polarization film or one or more films with small birefringence in the thickness direction are coated on a protection film using an adhesive or a bond.

Therefore, a VA-LCD of the present invention can provide high contrast characteristics for a front view and an oblique angle view and minimize color change for an oblique angle view.

Figure 1:
FIG. 1 is a sectional view that illustrates the fundamental structure of a polarization plate.
Figure 2:
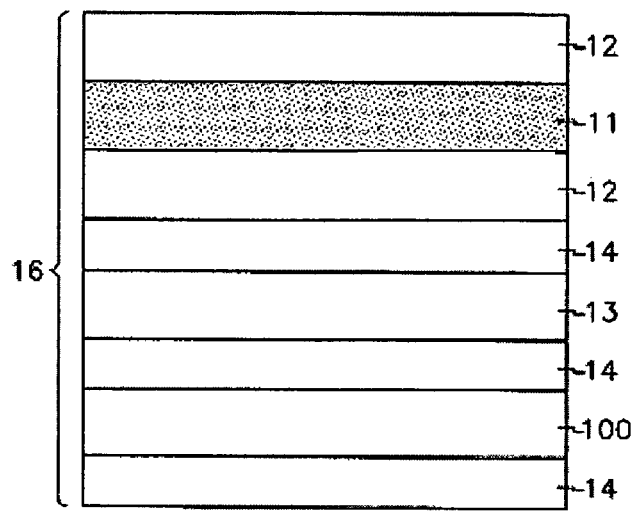
FIG. 2 is a sectional view that illustrates a conventional vertically aligned liquid crystal display (VA-LCD) in which an upper polarization plate and a lower polarization plate are respectively disposed on upper and lower surfaces of a VA panel.
Figure 2:
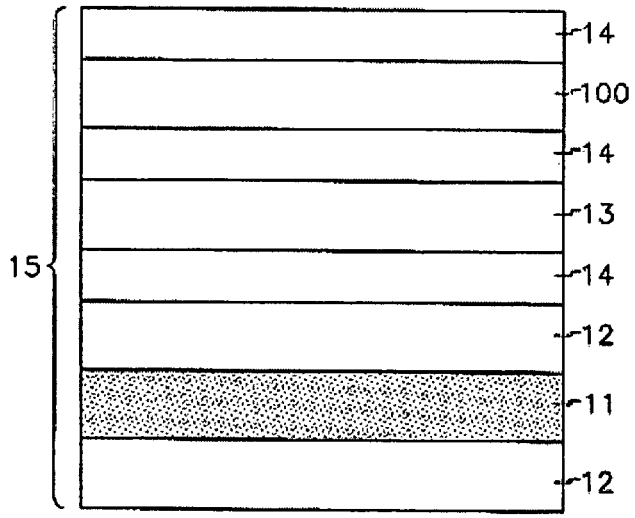

A reference numeral 1 is the absorption axis of a polarization plate, a reference numeral 2 is the optical slow axis of an A-plate, a reference numeral 3 is the absorption axis of a lower polarization plate, a reference numeral 4 is the absorption axis of an upper polarization plate, a reference numeral 5 is the orientation of a liquid crystal director in a liquid crystal cell, a reference symbol a is the absorption axis of a polarization plate, a reference symbol b is the optical slow axis of an A-plate, a reference numeral 10 is a VA panel, a reference numeral 11 is a polarization film, a reference numeral 12 is a protection film, a reference numeral 121 is an outer protection film, a reference numeral 122 is an inner protection film, a reference numeral 100 is a negative C-plate retardation film, a reference numeral 13 is an A-plate retardation film, a reference numeral 14 is an adhesive, a reference numeral 15 is a lower polarization plate, a reference numeral 16 is an upper polarization plate, and a reference numeral 200 is an inner protection and negative C-plate retardation film.

MODES FOR CARRYING OUT THE INVENTION

Hereinafter, the present invention will be described more specifically by Examples. However, the following Examples are provided only for illustrations and thus the present invention is not limited to or by them.

EXAMPLE 1

Figure 3:
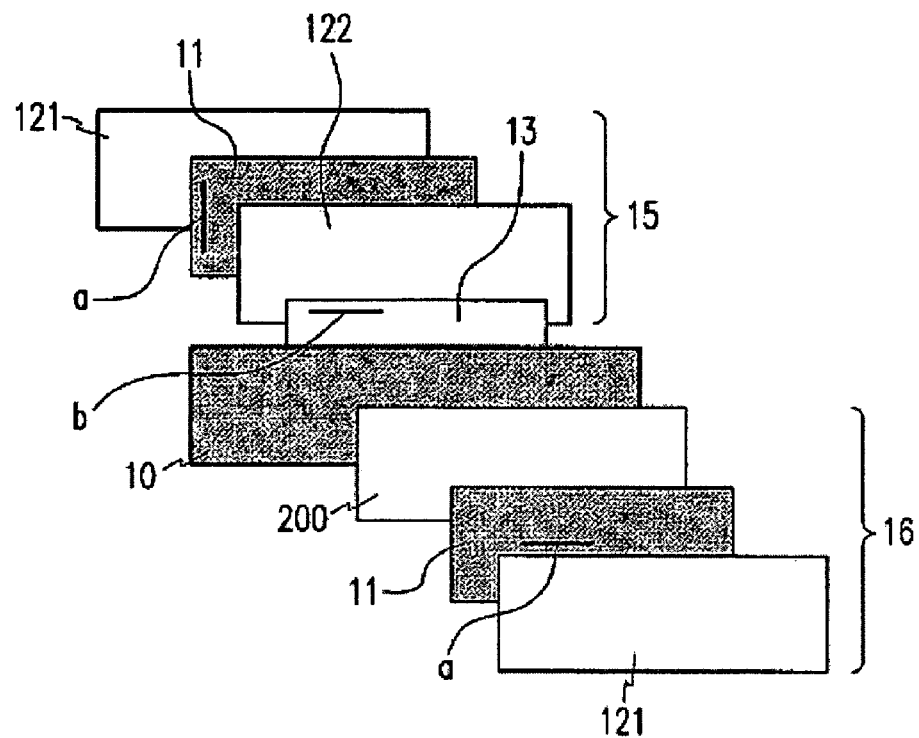
FIG. 3 is a diagram that illustrates a VA-LCD according to a first embodiment of the present invention.

Like the structure of FIG. 3, there was manufactured a vertically aligned liquid crystal display (VA-LCD) including a polynorbornene based polymer film serving both as a protection film and as a negative C-plate for an upper polarization plate. In FIG. 3, a reference symbol a is the absorption axis of a polarization plate and a reference symbol b is the slow axis of an A-plate.

A VA panel contained VA cells having a cell gap of 3 μm and a pre-tilt angle of 89 degrees and being filled with liquid crystals with negative dielectric anisotropy of $\Delta\in=-4.9$ and birefringence of $\Delta n=0.099$. The thickness retardation value ($R_{VA}(550\text{ nm})$) of the VA panel was 297 nm.

A lower polarization plate included, from bottom to top, an outer protection film made of a TAC polymer, a polarization film formed by dying a polyvinylalcohol (PVA) film with iodine followed by stretching, an inner protection film made of a TAC polymer, and an A-plate film made of polycarbonate. At this time, the thickness retardation value ($R_{-C1}(550\text{ nm})$) of the inner protection film was −65 nm. The A-plate film may be a uniaxial or biaxial film and had the in-plane retardation value ($R_A(550$ nm)) of 96 nm.

The upper polarization plate included, from bottom to top, a polynorbornene based polymer film serving both as an inner protection film and as a negative C-plate film, a polarization film formed by dying a PVA film with iodine followed by stretching, and an outer protection film made of a TAC polymer. At this time, the polynorbornene based polymer film had a thickness retardation value ($R_{-C2}(550$ nm)) of −160 nm.

Figure 22:
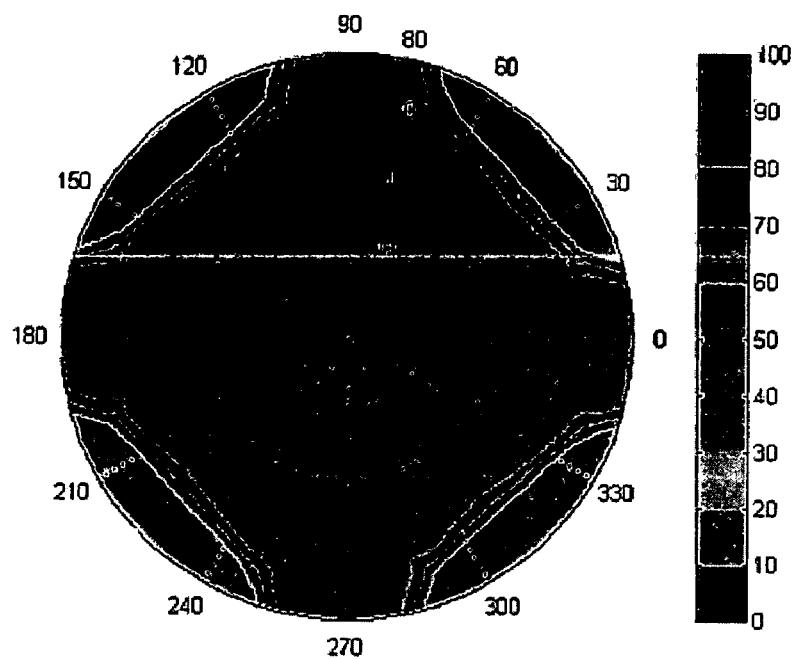
FIG. 22 illustrates iso-contrast characteristics of VA-LCDs of Examples 1-5.

Iso-contrast characteristics of the VA-LCD based on the above-described values are shown in FIG. 22. FIG. 22 shows an iso-contrast plot obtained by varying a polar angle from 0 to 80 degrees at 2-degree intervals with respect to the azimuth angle ranging from 0 to 360 degrees.

EXAMPLE 2

Figure 4:
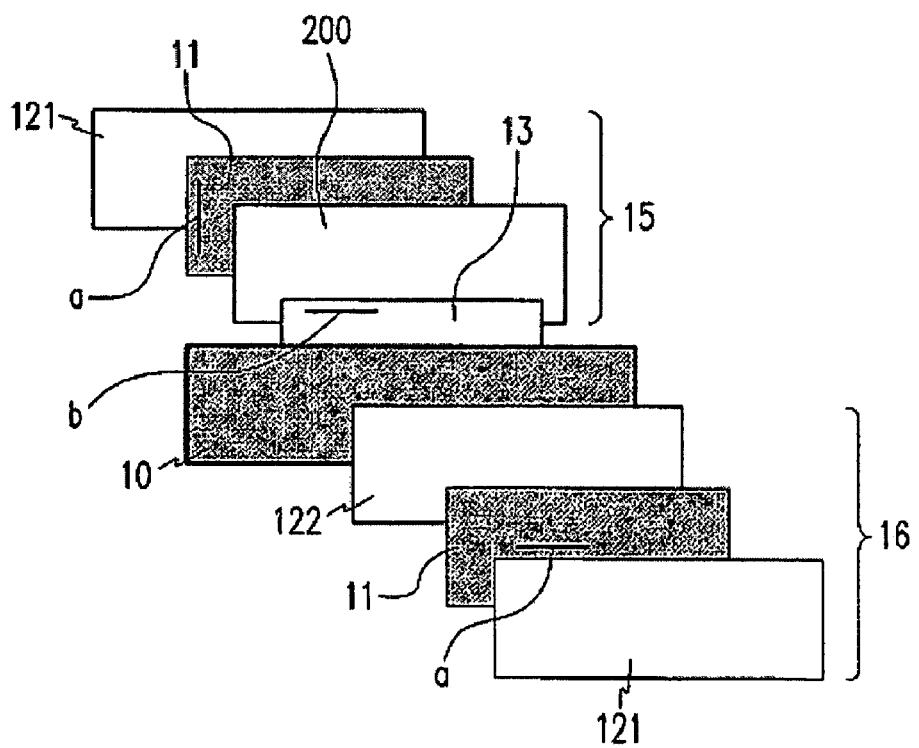
FIG. 4 is a diagram that illustrates a VA-LCD according to a second embodiment of the present invention.

Like the structure of FIG. 4, there was manufactured a VA-LCD including a polynorbornene based polymer film serving both as a protection film and as a negative C-plate for a lower polarization plate. In FIG. 4, a reference symbol a is the absorption axis of a polarization plate and a reference symbol b is the slow axis of an A-plate.

A VA panel contained VA cells having a cell gap of 3 μm and a pre-tilt angle of 89 degrees and being filled with liquid crystals with negative dielectric anisotropy of $\Delta\varepsilon=-4.9$ and birefringence of $\Delta n=0.099$. The thickness retardation value ($R_{VA}(550$ nm)) of the VA panel was 297 nm.

The lower polarization plate included, from bottom to top, an outer protection film made of a TAC polymer, a polarization film formed by dying a PVA film with iodine followed by stretching, a polynorbornene based polymer film serving both as an inner protection film and as a negative C-plate film, and an A-plate film made of polycarbonate. At this time, the polynorbornene based polymer film had the thickness retardation value ($R_{-C1}(550$ nm)) of −195 nm. The A-plate film may be a uniaxial or biaxial film and had the in-plane retardation value ($R_A(550$ nm)) of 48 nm.

An upper polarization plate included, from bottom to top, an outer protection film made of a TAC polymer, a polarization film formed by dying a PVA film with iodine followed by stretching, and an inner protection film made of a TAC polymer. At this time, the inner protection film had the thickness retardation value ($R_{-C2}(550$ nm)) of −44 nm.

Iso-contrast characteristics of the VA-LCD based on the above-described values are shown in FIG. 22. FIG. 22 shows an iso-contrast plot obtained by varying a polar angle from 0 to 80 degrees at 2-degree intervals with respect to the azimuth angle ranging from 0 to 360 degrees.

EXAMPLE 3

Figure 5:
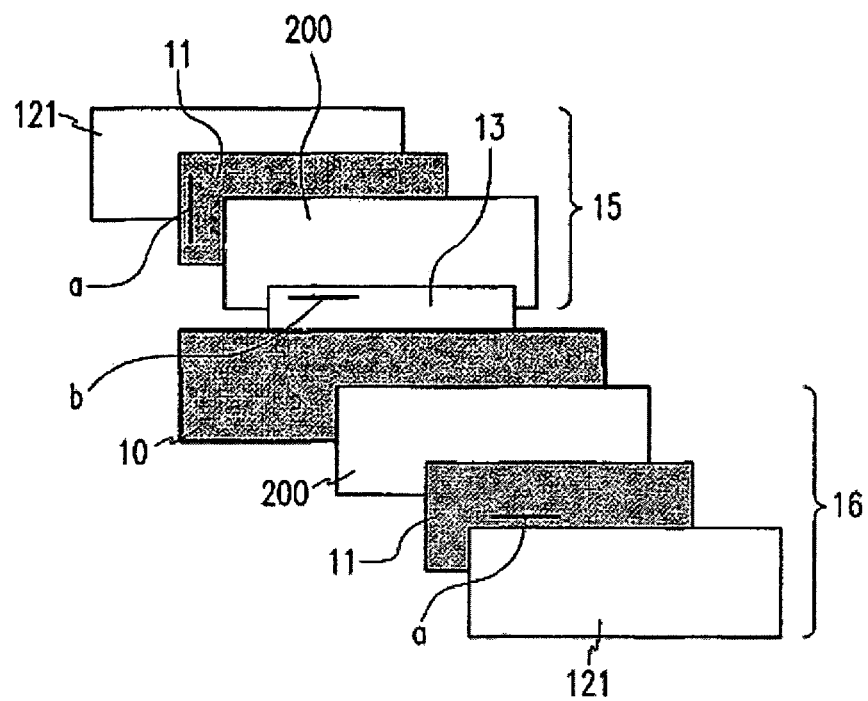
FIG. 5 is a diagram that illustrates a VA-LCD according to a third embodiment of the present invention.

Like the structure of FIG. 5, there was manufactured a VA-LCD including a polynorbornene-based polymer film serving both as an inner protection film and as a negative C-plate for an upper polarization plate and a lower polarization plate. In FIG. 5, a reference symbol a is the absorption axis of a polarization plate and a reference symbol b is the slow axis of an A-plate.

A VA panel contained VA cells having a cell gap of 3 μm and a pre-tilt angle of 89 degrees and being filled with liquid crystals with negative dielectric anisotropy of $\Delta\varepsilon=-4.9$ and birefringence of $\Delta n=0.099$. The thickness retardation value ($R_{VA}(550$ nm)) of the VA panel was 297 nm.

The lower polarization plate included, from bottom to top, an outer protection film made of a TAC polymer, a polarization film formed by dying a PVA film with iodine followed by stretching, a polynorbornene based polymer film serving both as an inner protection film and as a negative C-plate film, and an A-plate film made of polycarbonate. At this time, the polynorbornene based polymer film had the thickness retardation value ($R_{-C1}(550$ nm)) of −130 nm, and the A-plate film, which was a uniaxially stretched polycarbonate based A-plate film, had the in-plane retardation value ($R_A(550$ nm)) of 62 nm.

The upper polarization plate included, from bottom to top, a polynorbornene based polymer film serving both as an inner protection film and as a negative C-plate film, a polarization film formed by dying a PVA film with iodine followed by stretching, and an outer protection film made of a TAC polymer. At this time, the polynorbornene based polymer film had the thickness retardation value ($R_{-C2}(550$ nm)) of −106 nm.

Iso-contrast characteristics of the VA-LCD based on the above-described values are shown in FIG. 22. FIG. 22 shows an iso-contrast plot obtained by varying a polar angle from 0 to 80 degrees at 2-degree intervals with respect to the azimuth angle ranging from 0 to 360 degrees.

EXAMPLE 4

Figure 6:
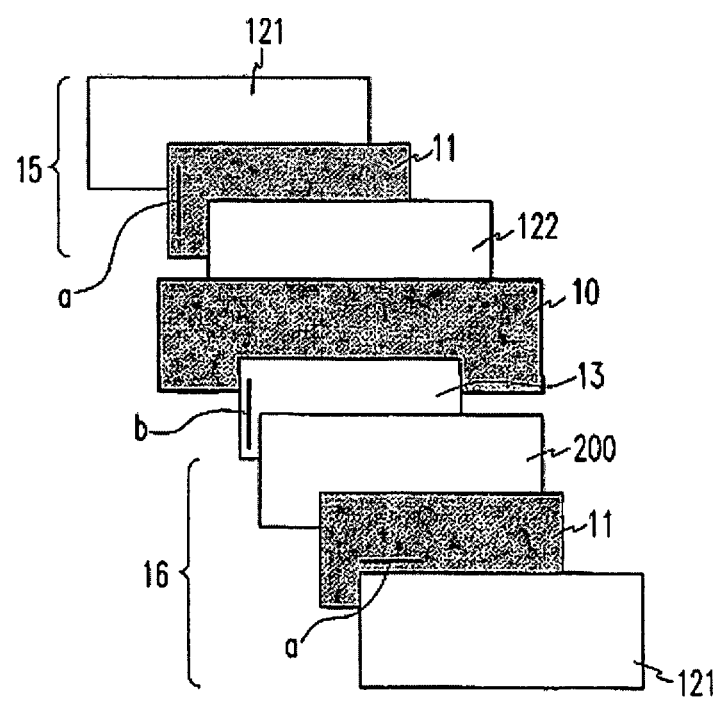
FIG. 6 is a diagram that illustrates a VA-LCD according to a fourth embodiment of the present invention.

Like the structure of FIG. 6, there was manufactured a VA-LCD including a polynorbornene-based polymer film serving both as an inner protection film and as a negative C-plate for an upper polarization plate. In FIG. 6, a reference symbol a is the absorption axis of a polarization plate and a reference symbol b is the slow axis of an A-plate.

A VA panel contained VA cells having a cell gap of 3 μm and a pre-tilt angle of 89 degrees and being filled with liquid crystals with negative dielectric anisotropy of $\Delta\varepsilon=-4.9$ and birefringence of $\Delta n=0.099$. The thickness retardation value ($R_{VA}(550$ nm)) of the VA panel was 297 nm.

A lower polarization plate included, from bottom to top, an outer protection film made of a TAC polymer, a polarization film formed by dying a PVA film with iodine followed by stretching, and an inner protection film made of a TAC polymer. At this time, the inner protection film had the thickness retardation value ($R_{-C1}(550$ nm)) of −65 nm.

The upper polarization plate included, from bottom to top, an A-plate film made of polycarbonate, a polynorbornene based polymer film serving both as an inner protection film and as a negative C-plate film, a polarization film formed by dying a PVA film with iodine followed by stretching, and an outer protection film made of a TAC polymer. At this time, the A-plate film had the in-plane retardation value ($R_A(550$ nm)) of 51 nm and the polynorbornene based polymer film had the thickness retardation value ($R_{-C2}(550$ nm)) of −165 nm.

Iso-contrast characteristics of the VA-LCD based on the above-described values are shown in FIG. 22. FIG. 22 shows an iso-contrast plot obtained by varying a polar angle from 0 to 80 degrees at 2-degree intervals with respect to the azimuth angle ranging from 0 to 360 degrees.

EXAMPLE 5

Figure 7:
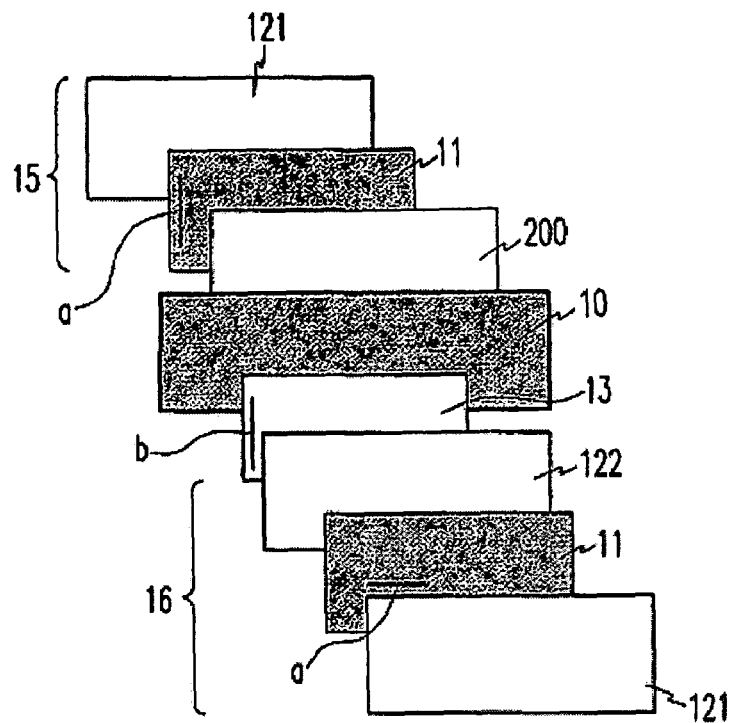
FIG. 7 is a diagram that illustrates a VA-LCD according to a fifth embodiment of the present invention.

Like the structure of FIG. 7, there was manufactured a VA-LCD including a polynorbornene-based polymer film serving both as an inner protection film and as a negative C-plate for a lower polarization plate. In FIG. 7, a reference symbol a is the absorption axis of a polarization plate and a reference symbol b is the slow axis of an A-plate.

A VA panel contained VA cells having a cell gap of 3 μm and a pre-tilt angle of 89 degrees and being filled with liquid crystals with negative dielectric anisotropy of $\Delta\varepsilon=-4.9$ and birefringence of Δn=0.099. The thickness retardation value ($R_{VA}$(550 nm)) of the VA panel was 297 nm.

The lower polarization plate included, from bottom to top, an outer protection film made of a TAC polymer, a polarization film formed by dying a PVA film with iodine followed by stretching, and a polynorbornene-based polymer film serving both as an inner protection film and as a negative C-plate. At this time, the polynorbornene based polymer film had the thickness retardation value ($R_{-C1}$(550 nm)) of −250 nm.

An upper polarization plate included, from bottom to top, an A-plate film made of polycarbonate, an inner protection film made of a cyclic olefin polymer (COP), a polarization film formed by dying a PVA film with iodine followed by stretching, and an outer protection film made of a TAC polymer. At this time, the inner protection film had the thickness retardation value ($R_{-C2}$(550 nm)) of about zero and the A-plate film had the in-plane retardation value ($R_A$(550 nm)) of 160 nm.

Iso-contrast characteristics of the VA-LCD based on the above-described values are shown in FIG. 22. FIG. 22 shows an iso-contrast plot obtained by varying a polar angle from 0 to 80 degrees at 2-degree intervals with respect to the azimuth angle ranging from 0 to 360 degrees.

EXAMPLE 6

Figure 9:
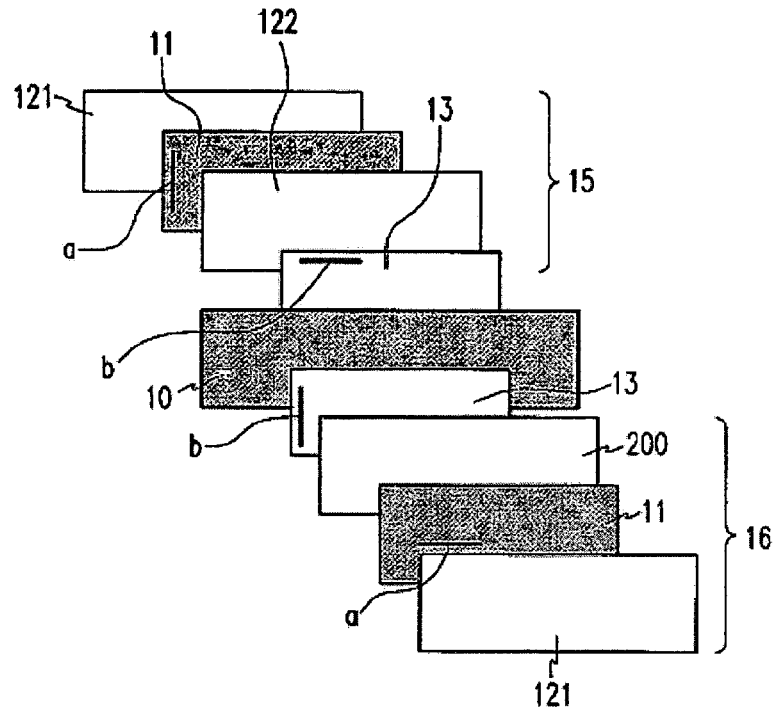
FIG. 9 is a diagram that illustrates a VA-LCD according to a seventh embodiment of the present invention.

Like the structure of FIG. 9, there was manufactured a VA-LCD including a polynorbornene-based polymer film serving both as a protection film and as a negative C-plate for an upper polarization plate. In FIG. 9, a reference symbol a is the absorption axis of a polarization plate and a reference symbol b is the slow axis of an A-plate.

A VA panel contained VA cells having a cell gap of 3 μm and a pre-tilt angle of 89 degrees and being filled with liquid crystals with negative dielectric anisotropy of Δ∈=−4.9 and birefringence of Δn=0.099. The thickness retardation value ($R_{VA}$(550 nm)) of the VA panel was 297 nm.

A lower polarization plate included, from bottom to top, an outer protection film made of a TAC polymer, a polarization film formed by dying a PVA film with iodine followed by stretching, an inner protection film made of a TAC polymer, and an A-plate film made of polycarbonate. At this time, the inner protection film had the thickness retardation value ($R_{-C1}$(550 nm)) of −65 nm. The A-plate film may be a uniaxial or biaxial film and had the in-plane retardation value ($R_A$(550 nm)) of 20 nm.

The upper polarization plate included, from bottom to top, an A-plate film made of polycarbonate, a polynorbornene-based polymer film serving both as an inner protection film and as a negative C-plate, a polarization film formed by dying a PVA film with iodine followed by stretching, and an outer protection film made of a TAC polymer. At this time, the polynorbornene-based polymer film had the thickness retardation value ($R_{-C2}$(550 nm)) of −150 nm and the A-plate film had the in-plane retardation value ($R_A$(550 nm)) of 51 nm.

Figure 23:
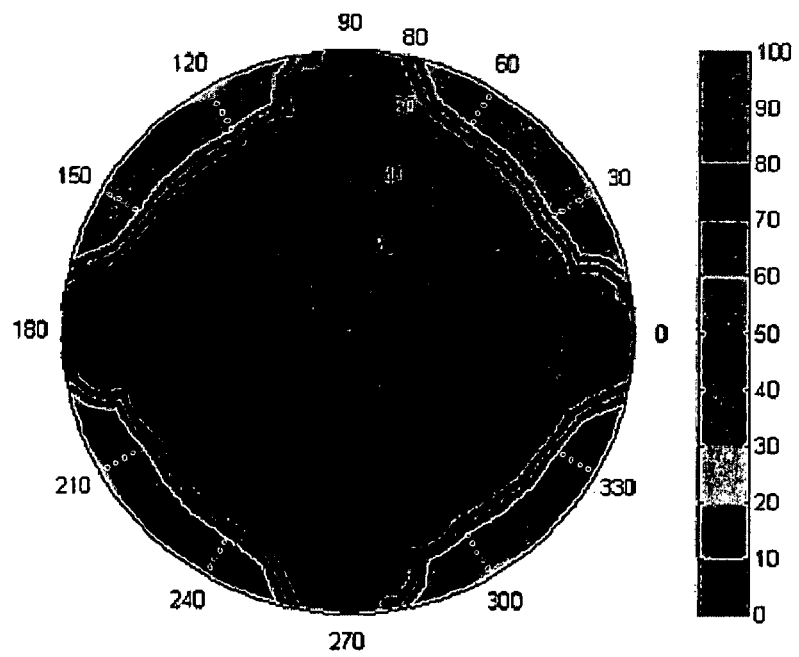
FIG. 23 illustrates iso-contrast characteristics of VA-LCDs of Examples 6-8.

Iso-contrast characteristics of the VA-LCD based on the above-described values are shown in FIG. 23. FIG. 23 shows an iso-contrast plot obtained by varying a polar angle from 0 to 80 degrees at 2-degree intervals with respect to the azimuth angle ranging from 0 to 360 degrees.

EXAMPLE 7

Figure 10:
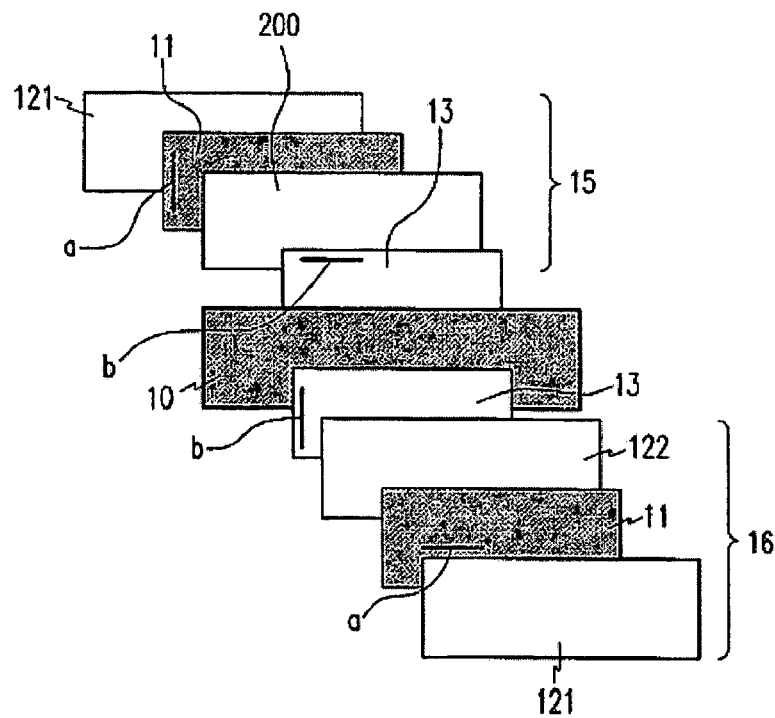
FIG. 10 is a diagram that illustrates a VA-LCD according to an eighth embodiment of the present invention.

Like the structure of FIG. 10, there was manufactured a VA-LCD including a polynorbornene-based polymer film serving both as a protection film and as a negative C-plate for a lower polarization plate. In FIG. 10, a reference symbol a is the absorption axis of a polarization plate and a reference symbol b is the slow axis of an A-plate.

A VA panel contained VA cells having a cell gap of 3 μm and a pre-tilt angle of 89 degrees and being filled with liquid crystals with negative dielectric anisotropy of Δ∈=−4.9 and birefringence of Δn=0.099. The thickness retardation value ($R_{VA}$(550 nm)) of the VA panel was 297 nm.

The lower polarization plate included, from bottom to top, an outer protection film made of a TAC polymer, a polarization film formed by dying a PVA film with iodine followed by stretching, a polynorbornene-based polymer film serving both as an inner protection film and as a negative C-plate, and an A-plate film made of polycarbonate. At this time, the polynorbornene-based polymer film had the thickness retardation value ($R_{-C2}$(550 nm)) of −170 nm, and the A-plate film had the in-plane retardation value ($R_A$(550 nm)) of 20 nm.

An upper polarization plate included, from bottom to top, an A-plate film made of polycarbonate, an inner protection film made of a TAC polymer, a polarization film formed by dying a PVA film with iodine followed by stretching, and an outer protection film made of a TAC polymer. At this time, the inner protection film had the thickness retardation value ($R_{-C1}$(550 nm)) of −65 nm and the A-plate film had the in-plane retardation value ($R_A$(550 nm)) of 51 nm.

Iso-contrast characteristics of the VA-LCD based on the above-described values are shown in FIG. 23. FIG. 23 shows an iso-contrast plot obtained by varying a polar angle from 0 to 80 degrees at 2-degree intervals with respect to the azimuth angle ranging from 0 to 360 degrees.

EXAMPLE 8

Figure 11:
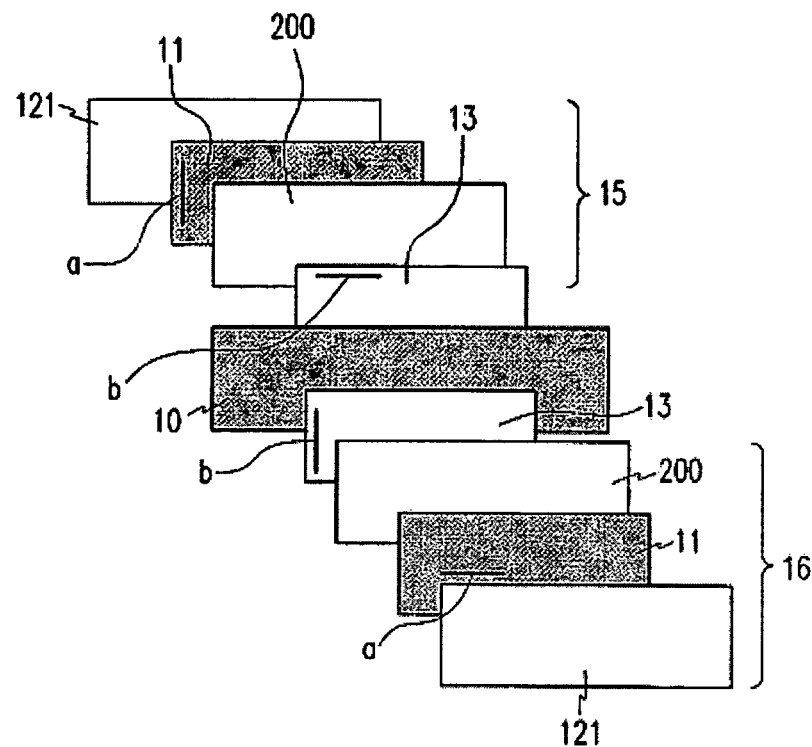
FIG. 11 is a diagram that illustrates a VA-LCD according to a ninth embodiment of the present invention.

Like the structure of FIG. 11, there was manufactured a VA-LCD including a polynorbornene-based polymer film serving both as a protection film and as a negative C-plate for lower and upper polarization plates. In FIG. 11, a reference symbol a is the absorption axis of a polarization plate and a reference symbol b is the slow axis of an A-plate.

A VA panel contained VA cells having a cell gap of 3 μm and a pre-tilt angle of 89 degrees and being filled with liquid crystals with negative dielectric anisotropy of Δ∈=−4.9 and birefringence of Δn=0.099. The thickness retardation value ($R_{VA}$(550 nm)) of the VA panel was 297 nm.

The lower polarization plate included, from bottom to top, an outer protection film made of a TAC polymer, a polarization film formed by dying a PVA film with iodine followed by stretching, a polynorbornene-based polymer film serving both as an inner protection film and as a negative C-plate, and an A-plate film made of polycarbonate. At this time, the polynorbornene-based polymer film had the thickness retardation value ($R_{-C2}$(550 nm)) of −105 nm, and the A-plate film had the in-plane retardation value ($R_A$(550 nm)) of 40 nm.

The upper polarization plate included, from bottom to top, an A-plate film made of polycarbonate, a polynorbornene-based polymer film serving both as an inner protection film and as a negative C-plate, a polarization film formed by dying a PVA film with iodine followed by stretching, and an outer protection film made of a TAC polymer. At this time, the polynorbornene-based polymer film had the thickness retardation value ($R_{-C2}$(550 nm)) of −105 nm and the A-plate film had the in-plane retardation value ($R_A$(550 nm)) of 40 nm.

Iso-contrast characteristics of the VA-LCD based on the above-described values are shown in FIG. 23. FIG. 23 shows an iso-contrast plot obtained by varying a polar angle from 0 to 80 degrees at 2-degree intervals with respect to the azimuth angle ranging from 0 to 360 degrees.

When a polynorbornene-based polymer film according to the present invention is used as an inner protection film, a combined film of an inner protection film and a negative C-plate compensation film, or a separate negative C-plate compensation film added to a fundamental polarization plate including an outer protection film, a polarization film, and an inner protection film, as shown in FIGS. 3 through 18, film materials constituting polarization plates are listed in Table 1 below. However, the present invention is not limited to those given in Table 1.

TABLE 1

Figure 8:
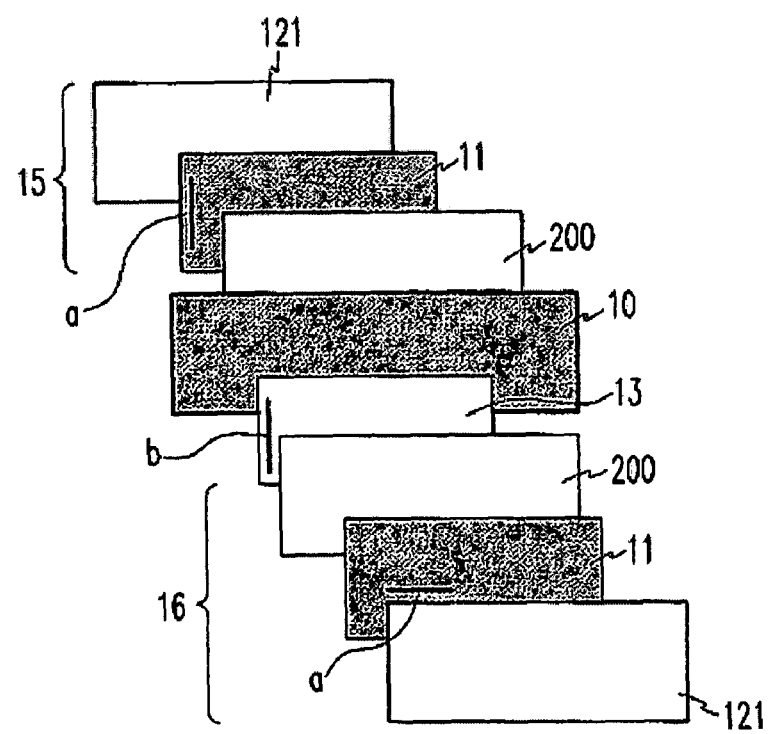
FIG. 8 is a diagram that illustrates a VA-LCD according to a sixth embodiment of the present invention.
Figure 12:
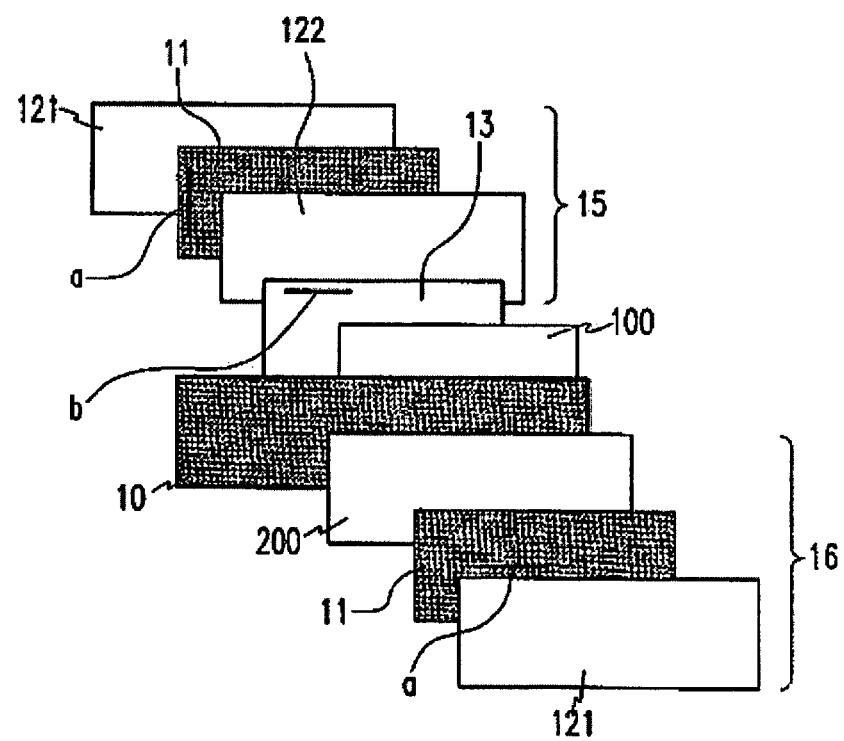
FIG. 12 is a diagram that illustrates a VA-LCD according to a tenth embodiment of the present invention.
Figure 13:
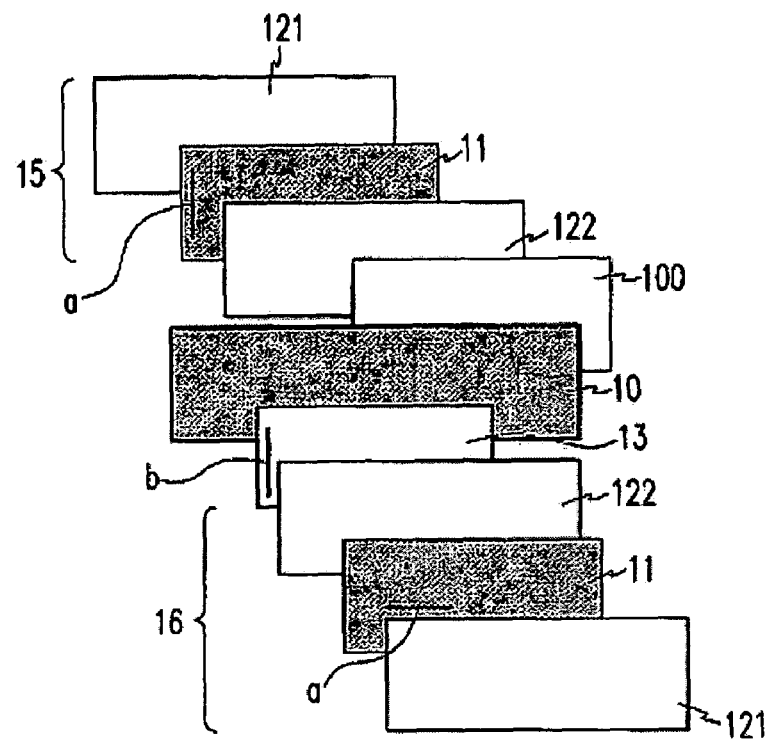
FIG. 13 is a diagram that illustrates a VA-LCD according to an eleventh embodiment of the present invention.
Figure 14:
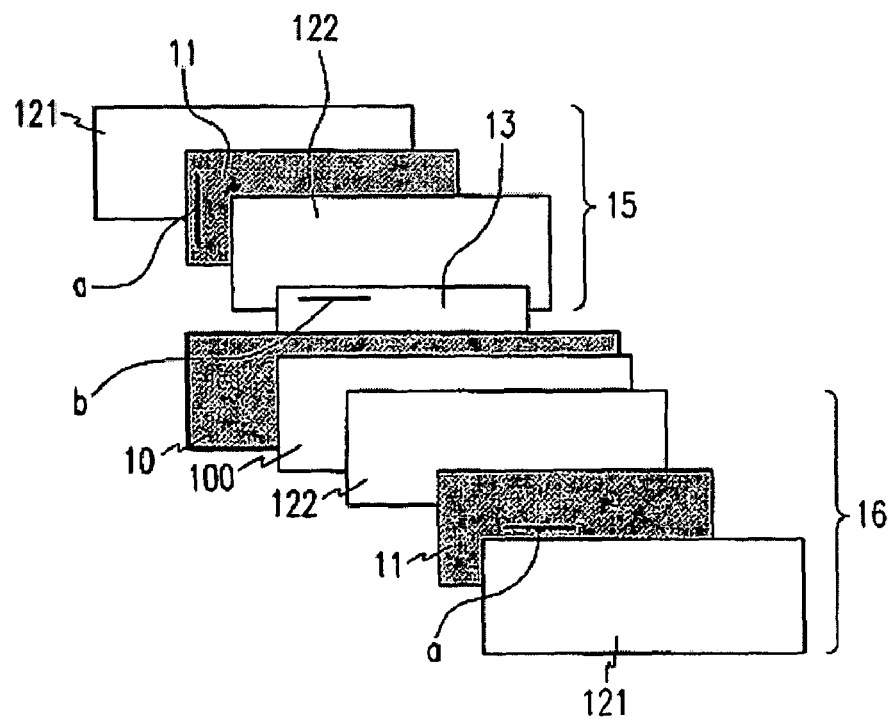
FIG. 14 is a diagram that illustrates a VA-LCD according to a twelfth embodiment of the present invention.
Figure 15:
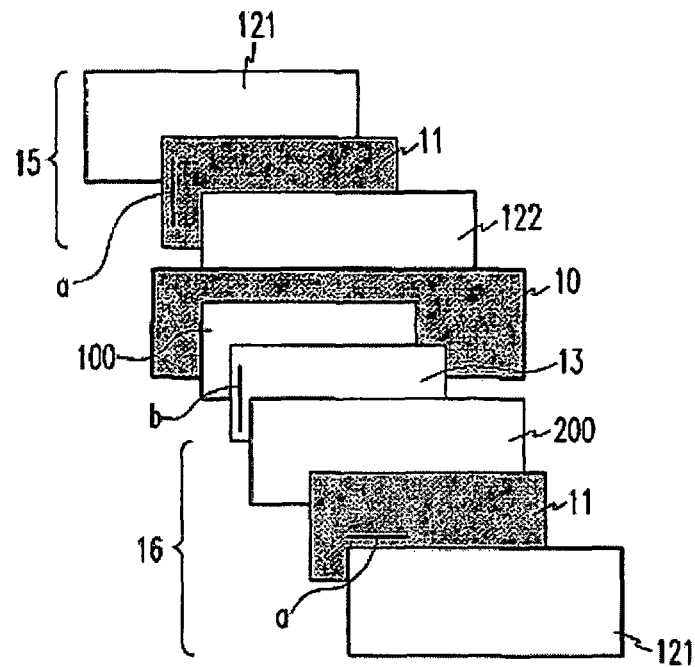
FIG. 15 is a diagram that illustrates a VA-LCD according to a thirteenth embodiment of the present invention.
Figure 16:
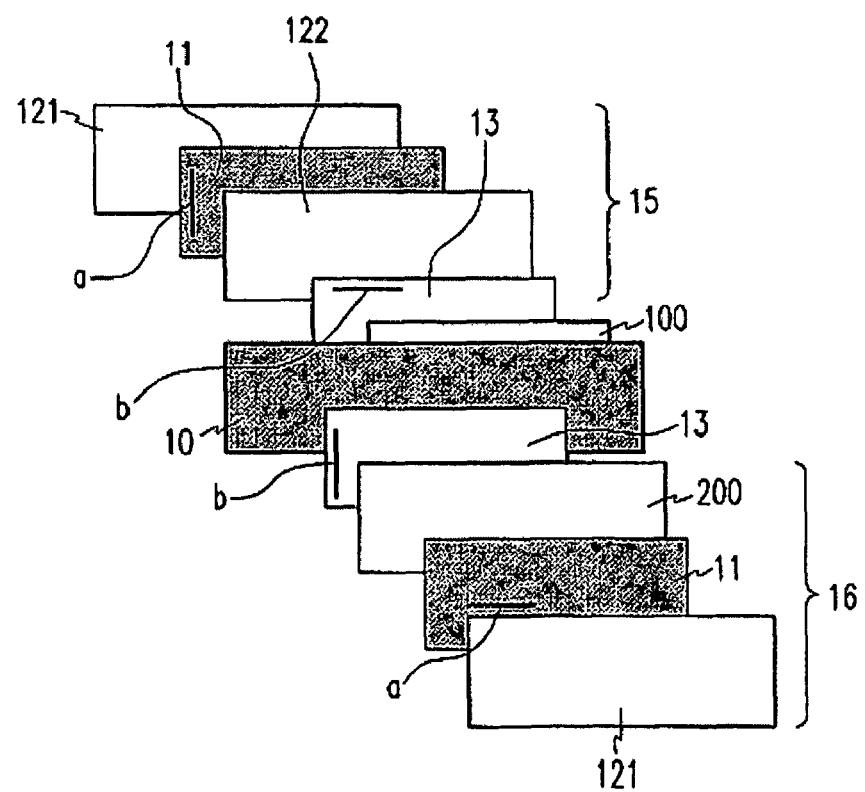
FIG. 16 is a diagram that illustrates a VA-LCD according to a fourteenth embodiment of the present invention.
Figure 17:
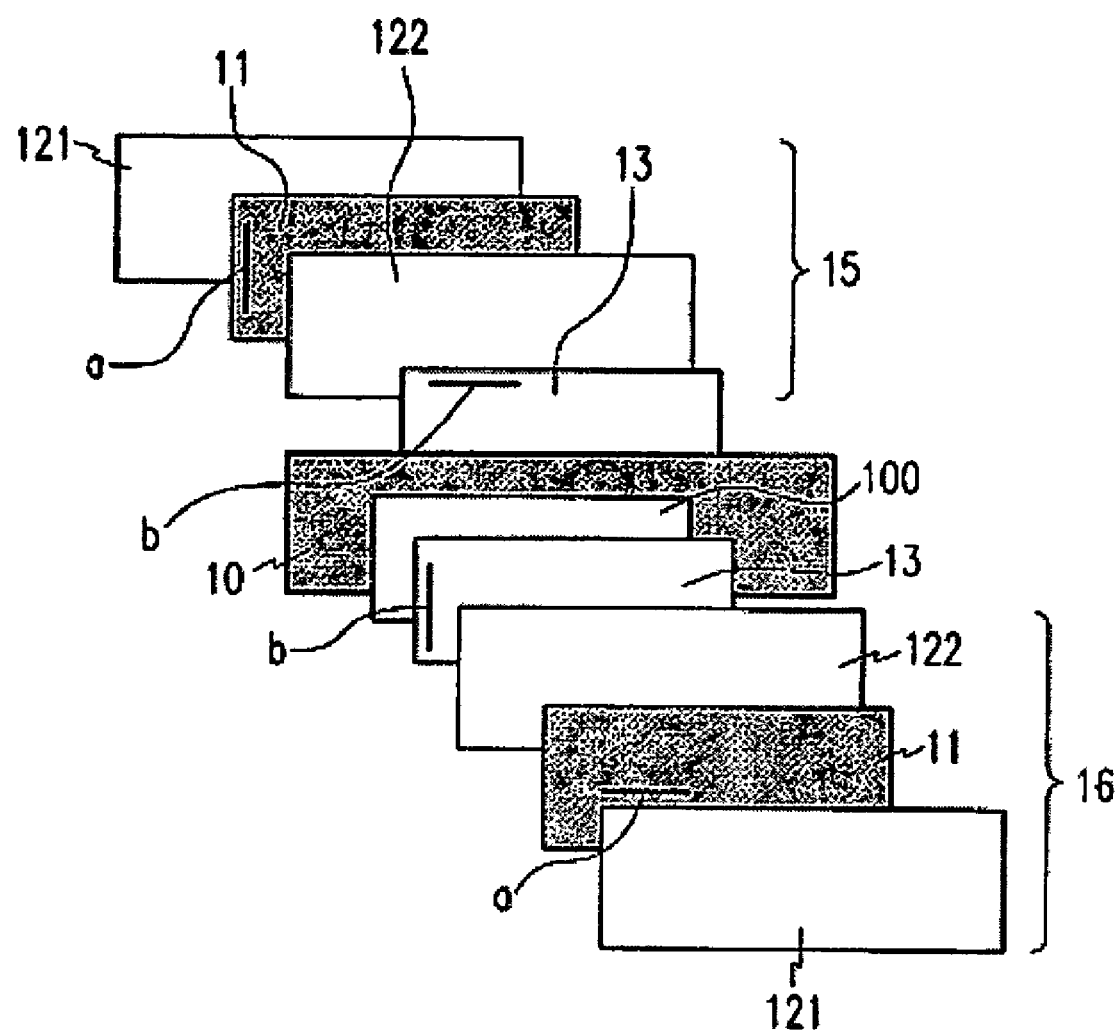
FIG. 17 is a diagram that illustrates a VA-LCD according to a fifteenth embodiment of the present invention.
Figure 18:
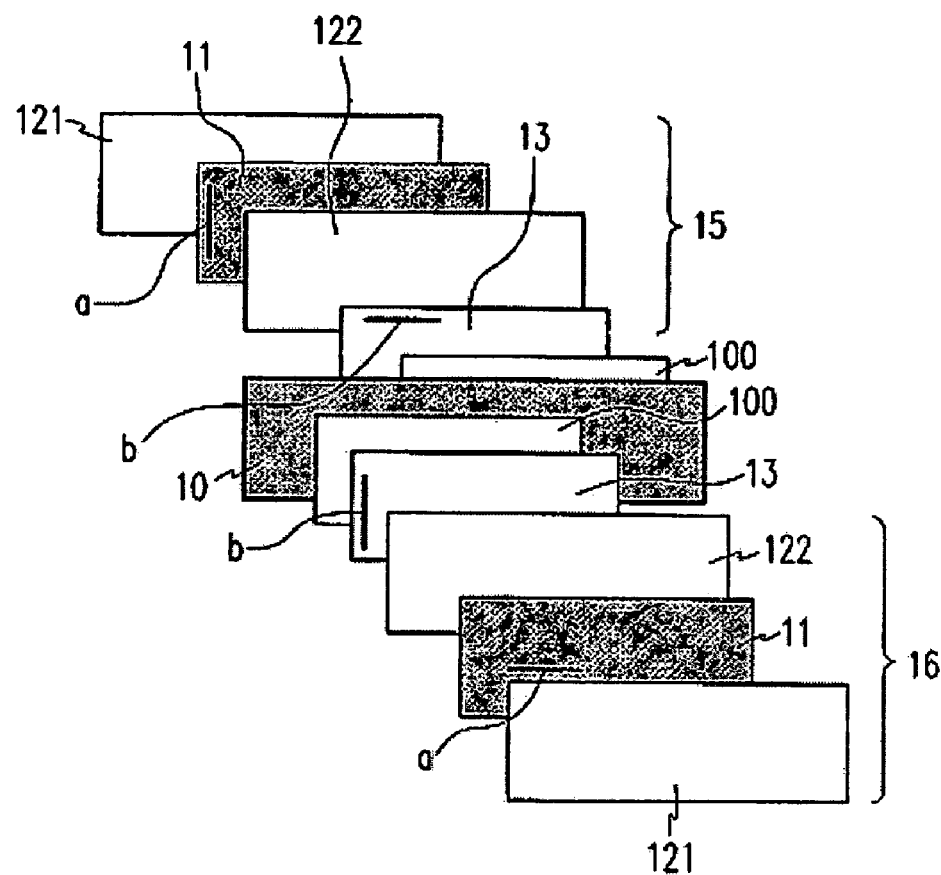
FIG. 18 is a diagram that illustrates a VA-LCD according to a sixteenth embodiment of the present invention.
Figure 19:
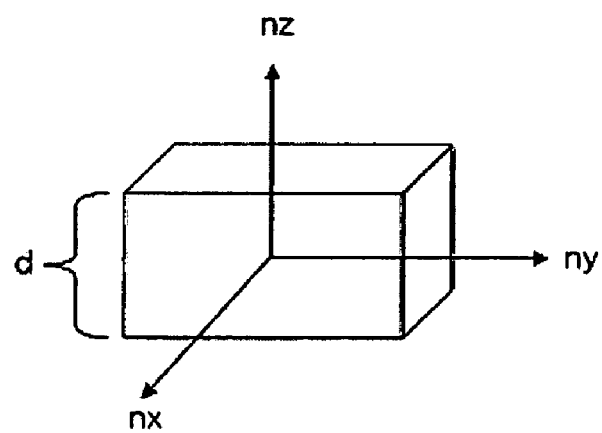
FIG. 19 illustrates a coordinate system used in defining the refractive index of a film according to the present invention.
Figure 20:
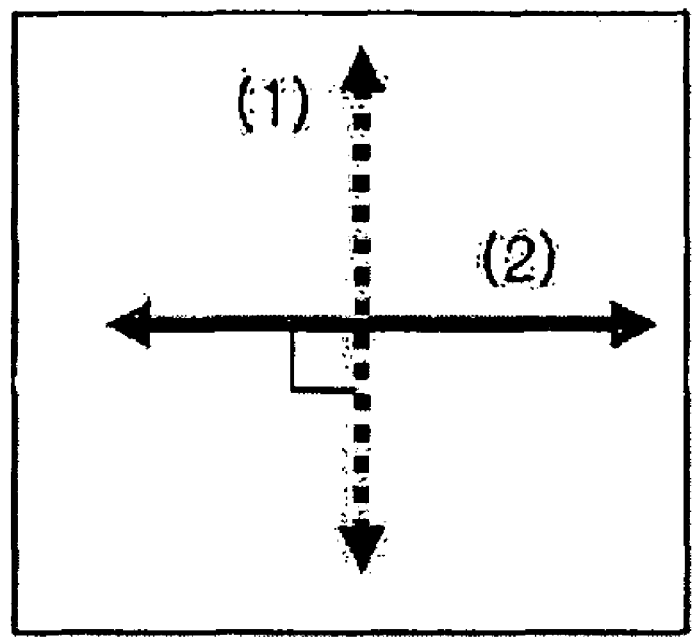
FIG. 20 illustrates an angle formed between an optical axis of an A-plate and an absorption axis of a polarization plate in a VA-LCD of the present invention.
Figure 21:
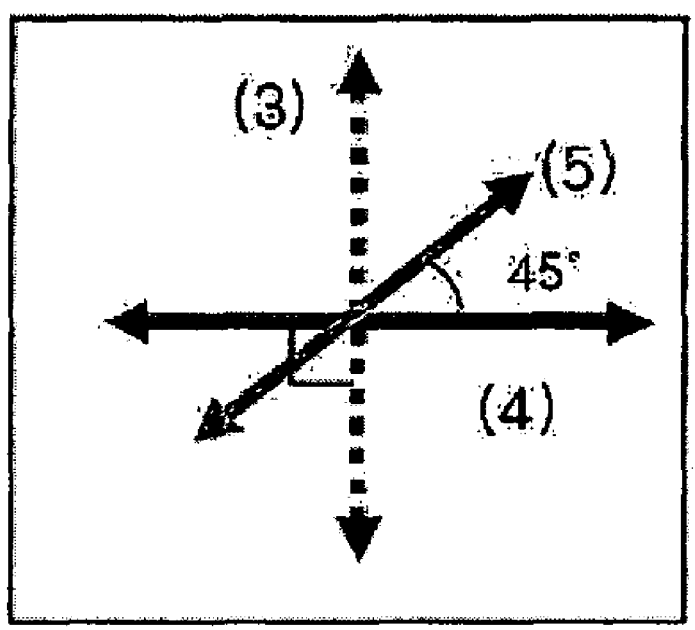
FIG. 21 illustrates an angle formed between absorption axes of upper and lower polarization plates of a VA-LCD according to the present invention.

| Section | A | B | C | D | E | F | Example of structure |
|---|---|---|---|---|---|---|---|
| Structure 1 | TAC or COP | O | — | — | Uni or Bi | — | FIG. 3, Example 1 |
| Structure 2 | O | TAC or COP | — | — | Uni or Bi | — | FIG. 4, Example 2 |
| Structure 3 | O | O | — | — | Uni or Bi | — | FIG. 5, Example 3 |
| Structure 4 | TAC or COP | O | — | — | — | Uni or Bi | FIG. 6, Example 4 |
| Structure 5 | O | TAC or COP | — | — | — | Uni or Bi | FIG. 7, Example 5 |
| Structure 6 | O | O | — | — | — | Uni or Bi | FIG. 8 |
| Structure 7 | TAC or COP | O | — | — | Uni or Bi | Uni or Bi | FIG. 9, Example 6 |
| Structure 8 | O | TAC or COP | — | — | Uni or Bi | Uni or Bi | FIG. 10, Example 7 |
| Structure 9 | O | O | — | — | Uni or Bi | Uni or Bi | FIG. 11, Example 8 |
| Structure 10 | TAC or COP | TAC or COP | O | — | Uni or Bi | — | FIG. 12 |
| Structure 11 | TAC or COP | TAC or COP | O | — | — | Uni or Bi | FIG. 13 |
| Structure 12 | TAC or COP | TAC or COP | — | O | Uni or Bi | — | FIG. 14 |
| Structure 13 | TAC or COP | TAC or COP | — | O | — | Uni or Bi | FIG. 15 |
| Structure 14 | TAC or COP | TAC or COP | O | — | Uni or Bi | Uni or Bi | FIG. 16 |
| Structure 15 | TAC or COP | TAC or COP | — | O | Uni or Bi | Uni or Bi | FIG. 17 |
| Structure 16 | TAC or COP | TAC or COP | O | O | Uni or Bi | Uni or Bi | FIG. 18 |

In Table 1, A is an inner protection film or a protection and first negative C-plate film for a lower polarization plate, B is an inner protection film or a protection and first negative C-plate film for an upper polarization plate, C is a second negative C-plate film for the lower polarization plate, D is a second negative C-plate film for the upper polarization plate, E is an A-plate film for the lower polarization plate, F is an A-plate film for the upper polarization plate, TAC is a triacetate cellulose film, COP is a film made of a cyclic olefin copolymer in which cyclic olefin and non-cyclic olefin coexist on a polymer backbone, O is a polynorbornene based polymer film, Uni is a uniaxial A-plate film, and Bi is a biaxial A-plate film. Examples of the uniaxial A-plate film include a uniaxially stretched COP film, a uniaxially stretched polycarbonate film, and a photo-curable liquid crystal film using a homogeneously oriented nematic liquid crystal. Examples of the biaxial A-plate film include a biaxially stretched cellulose film, a biaxially stretched polynorbornene film, a biaxially stretched COP film, and a biaxially stretched polycarbonate film.

In the structures of Table 1, in connection with structures 1, 4, and 7, the polynorbornene based polymer films simultaneously served as inner protection films and negative C-plate films for the upper polarization plates. In connection with structures 2, 5, and 8, the polynorbornene based polymer films simultaneously served as inner protection films and negative C-plate films for the lower polarization plates. In connection with structures 3, 6, and 9, the polynorbornene based polymer films simultaneously served as inner protection films and negative C-plate films for upper and lower polarization plates. The polynorbornene based polymer films of structures 10-16 served only as negative C-plate films added to the polarization plates.

INDUSTRIAL APPLICABILITY

As apparent from the above description, in a vertically aligned liquid crystal display (VA-LCD) according to the present invention, a polynorbornene-based polymer film is used as a protection film for a polarization plate and/or as a negative C-plate compensation film. Therefore, high contrast characteristics for a front view and an oblique angle view can be realized and color change for an oblique angle view can be minimized.

What is claimed is:

1. A vertically aligned liquid crystal display comprising at least one unstretched polynorbornene based negative C-plate retardation film for thickness retardation compensation between a vertically aligned panel and a polarization film, wherein a total thickness retardation value ($R_{total}$) of the vertically aligned liquid crystal display is defined as:

$$R_{total} = R_{-C} + R_{VA}, \quad \text{(Equation 3)}$$

$$30\ nm \leq R_{total}(=R_{VA}+R_{-C}) \leq 180\ nm, \quad \text{(Equation 4)}$$

wherein $R_{-C}$ is total thickness retardation value for all negative C-plate type films that can be used for optical compensation in the thickness direction, as given by:

$R_{-C}$=(thickness retardation value of inner protection film of polarization plate)+(thickness retardation value of biaxial A-plate)+(thickness retardation value of negative C-plate);

$R_{VA}$ is the retardation value of the vertically aligned panel; and $R_{total}$ is the sum of $R_{VA}$ and $R_{-C}$.

2. The vertically aligned liquid crystal display of claim 1, wherein the polynorbornene based negative C-plate retardation film is formed by solution casting.

3. The vertically aligned liquid crystal display of claim 1, wherein the polynorbornene based negative C-plate retardation film has a refractive index satisfying the following Equation:

$$n_x = n_y > n_z, \quad \text{(Equation 10)}$$

wherein $n_x$ and $n_y$ are each an in-plane refractive index as measured at a wavelength of 550 nm; and $n_z$ is a thickness refractive index as measured at a wavelength of 550 nm.

4. The vertically aligned liquid crystal display of claim 1, which comprises, from bottom to top, a lower polarization plate, a vertically aligned panel, and an upper polarization plate, and wherein at least one of the lower polarization plate and the upper polarization plate comprises at least one negative C-plate type retardation film made of a polynorbornene based polymer.

5. The vertically aligned liquid crystal display of claim 1, which comprises, from bottom to top, a lower polarization plate, a vertically aligned panel, and an upper polarization plate, and wherein at least one of the lower polarization plate and the upper polarization plate comprises an inner protection film made of a polynorbornene based polymer.

6. The vertically aligned liquid crystal display of claim 1, further comprising a biaxial A-plate retardation film with refractive index satisfying one of the following Equations, obtained by stretching a polynorbornene based polymer film:

$$n_x > n_y = n_z, \quad \text{(Equation 8)}$$

$$n_x > n_y > n_z, \quad \text{(Equation 9)}$$

wherein $n_x$ and $n_y$ are each an in-plane refractive index as measured at a wavelength of 550 nm; and $n_z$ is a thickness refractive index as measured at a wavelength of 550 nm.

7. The vertically aligned liquid crystal display of claim 6, wherein the A-plate retardation film has normal wavelength dispersion, flat wavelength dispersion, or reverse wavelength dispersion.

8. The vertically aligned liquid crystal display of claim 1, wherein the vertically aligned panel is an MVA (multidomain vertically aligned) mode panel, a PVA (patterned vertically aligned) mode panel, or a VA (vertically aligned) mode panel using a chiral additive, and wherein a cell gap between liquid crystal cells constituting the vertically aligned panel is in the range from 3 to 8 μm.

\* \* \* \* \*